(12) United States Patent
Afferton et al.

(10) Patent No.: US 6,278,689 B1
(45) Date of Patent: Aug. 21, 2001

(54) OPTICAL CROSS-CONNECT RESTORATION TECHNIQUE

(75) Inventors: Thomas S. Afferton, Somerset; John Lester Strand, Holmdel, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/064,410

(22) Filed: Apr. 22, 1998

(51) Int. Cl.$^7$ .............................. H04L 12/26; H04B 10/08
(52) U.S. Cl. ..................... 370/223; 370/228; 370/242; 359/110; 359/119
(58) Field of Search ........................... 370/216, 221, 370/222, 223, 224, 225, 228, 242, 245, 400, 401, 402, 403, 404, 405, 406; 359/110, 115, 119, 109, 118

(56) References Cited

U.S. PATENT DOCUMENTS

| | | | |
|---|---|---|---|
| 5,181,134 | 1/1993 | Fatehi et al. | 359/117 |
| 5,491,686 * | 2/1996 | Sato | 370/223 |
| 5,661,720 * | 8/1997 | Taniguchi | 370/223 |
| 5,708,753 | 1/1998 | Frigo et al. | 385/147 |
| 5,726,788 | 3/1998 | Fee et al. | 359/163 |
| 5,751,696 * | 5/1998 | Bechtel et al. | 370/223 |
| 5,909,175 * | 6/1999 | Yamasaki et al. | 370/223 |

OTHER PUBLICATIONS

U.S. Patent Application Serial No. (Afferton 2–6–1–2–8–1–2), filed on Dec. 30, 1997 in the names of Thomas Afferton et al. and assigned to AT&T.

* cited by examiner

*Primary Examiner*—Ricky Ngo
(74) *Attorney, Agent, or Firm*—Robert B. Levy

(57) ABSTRACT

An alarm and restoration system (28) accomplishes restoration in a ring network ($10_i$) by monitoring network traffic to detect the occurrence of a single failure arising from a failed optical service path ($14_i$) and the occurrence of a double failure arising from a failed optical service path and an occupied optical protection path ($16_i$). In case of a single failure, the alarm and restoration system (28) restores traffic in the network itself by routing traffic on a restoration path. In the even of a double failure, the alarm and restoration system (28) routes traffic from the failed ring network through an Optical Cross-Connect mesh (22) to transform the double failure into a single failure that can be restored in the network itself.

6 Claims, 4 Drawing Sheets

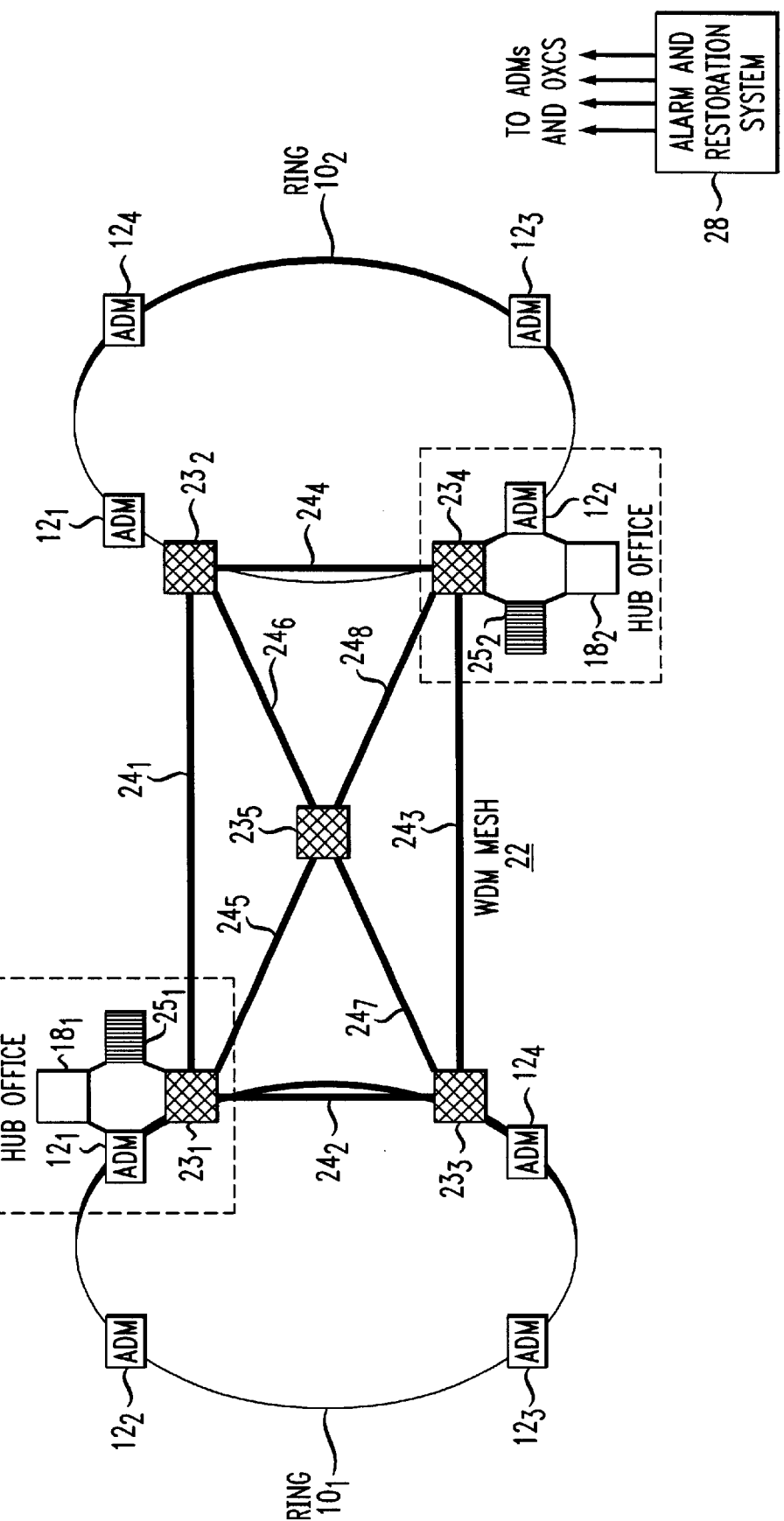

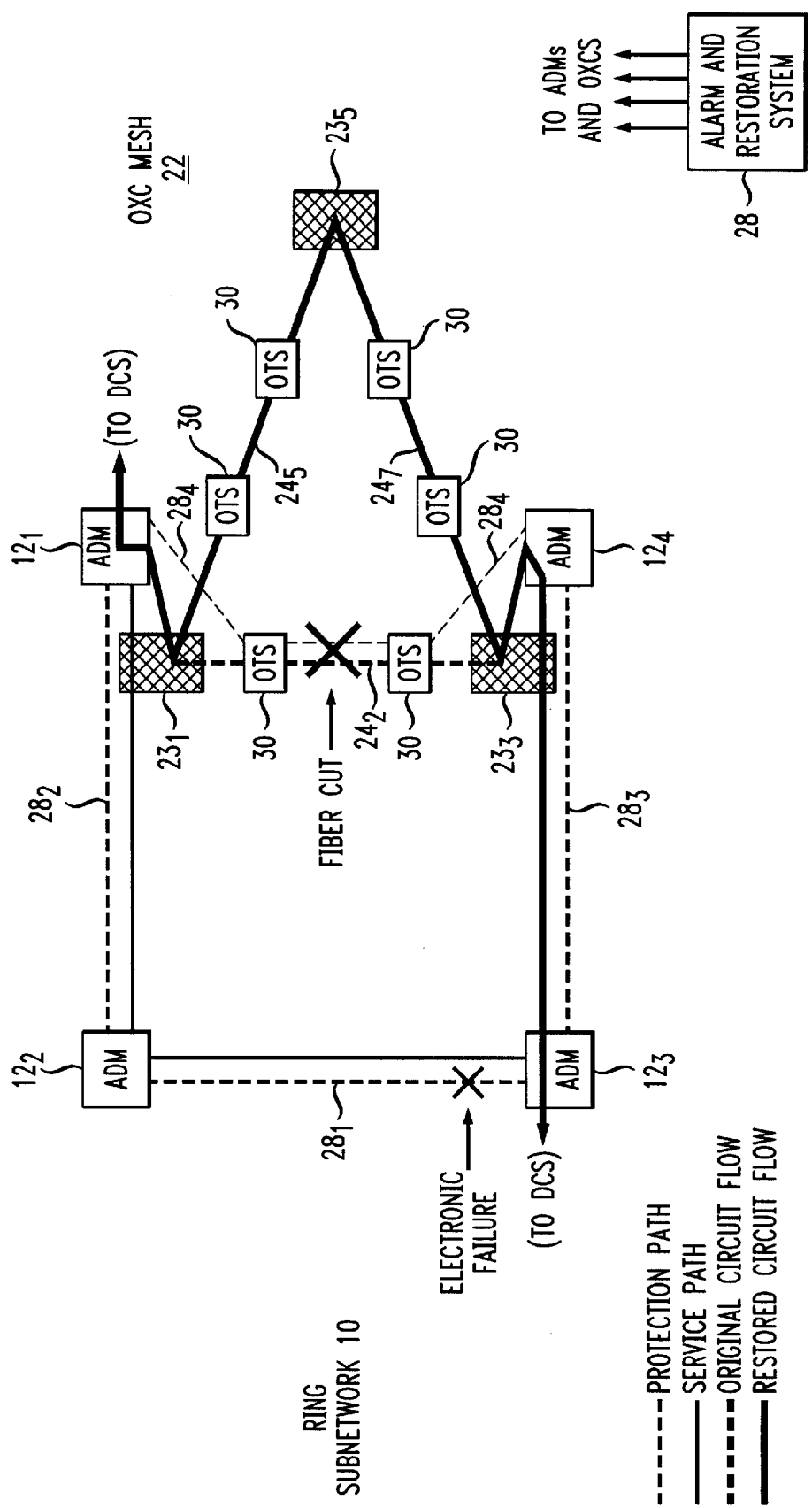

OPTICAL CROSS-CONNECT RESTORATION TECHNIQUE

TECHNICAL FIELD

This invention relates to a technique for restoring optically formatted traffic in a ring subnetwork in case of a double ring failure.

BACKGROUND ART

Many network providers of telecommunication services, such as AT&T, now utilize Synchronous Optical NETwork (SONET) rings interconnected in a network for transporting optically formatted traffic. A typical SONET ring subnetwork comprises a plurality of nodes, each linked to its two neighbors by an optical fiber service path and protection path in a ring-like arrangement. At each individual node, an Add-Drop Multiplexer (ADM) typically routes traffic onto, and off the ring subnetwork to permit traffic to pass on the ring between nodes. In practice, inter-ring traffic received at a node on one ring is coupled by a Digital Cross-Connect System (DCS) for routing on a second ring subnetwork to its ultimate destination.

During normal operation, optically formatted traffic within a ring passes from one node to another via the optical fiber service path. Should the optical fiber service path connecting a pair of nodes become unavailable to carry traffic, due to a fiber cut, for example, the traffic that would otherwise pass on the service path passes on the protection path. U.S. Pat. No. 5,182,744, issued on Jun. 26, 1993, in the name of James Askew et al., and assigned to AT&T Bell Laboratories (incorporated by reference herein) describes a technique for restoring optically formatted traffic in a mesh network in case of a failure of the optical service path between nodes. The Askew et al. technique can be utilized in a ring subnetwork to restore traffic in case of a "single" ring failure, i.e., the failure of a optical service path or a node linked to such a path.

In addition to suffering single failures as discussed above, a SONET ring subnetwork can also suffer, for example, a "double" ring failure. A double ring failure occurs when optical service and protection paths on a given span in a SONET ring fail, due to a cable break for example, and a "non-associated" protection path (i.e., a protection path on a span different from the span with the cable break) also fails. A double ring failure is generally not restorable via the ring itself, giving rise to a service outage which is costly from both a revenue and customer satisfaction perspective.

Thus, there is a need for a technique for restoring service in an optical subnetwork, such as a SONET ring subnetwork, in case of a double failure.

BRIEF SUMMARY OF THE INVENTION

Briefly, in accordance with a preferred embodiment, the present invention provides a technique for restoring service in an optical sub-subnetwork, such as a SONET ring, comprised of nodes connected by optical paths in a deliberate manner with predetermined protection paths for single failures. In accordance with the invention, the service optical paths in the subnetwork are connected through an optical cross-connect device (OXCD) at each end of the optical path. These OXCDs connect to each other, and other OXCDs associated with other subnetworks, in a matrix to form an optical cross-connect mesh network that provides a plurality of optical paths between each pair of OXCDs.

Also in accordance with the invention, a centralized monitoring system monitors traffic in each subnetwork to detect the failure of a path, service-bearing equipment within a node, a node itself, or any combination of such failures. Once the monitoring system detects a failure, the system determines the particular nature of the failure. In other words, the monitoring system determines whether the failure is a "single failure" (i.e. a failure for which a predetermined protection path is available) or a "double failure", (i.e. a path failure combined with another failure for which the predetermined protection path cannot restore traffic). Upon detection of a double failure, the monitoring system determines an alternate optical path through the OXC mesh between the OXCDs on either end of the failed optical service path in the failed subnetwork. The alternate optical path can be found from unused capacity (spare or not-in-use protection paths for other subnetworks) in the optical mesh. Further, the alternate optical path can be established without regard for optical impairments if the OXC mesh is an "opaque" optical network, as taught in Afferton U.S. patent application Ser. No. 2,612,812, filed on Dec. 30, 1997 in the names of) Thomas Afferton et al. and assigned to AT&T (hereinafter incorporated by reference). The alternate path through the OXC mesh network restores the failed optical path in the failed subnetwork, reducing the failure to a "single failure", thus allowing the subnetwork to protect itself and restore the traffic.

The technique of the present invention affords the advantage that the subnetwork itself can accomplish restoration in case of a single failure. However, in case of a double failure, where ring protection is not possible by the subnetwork itself, the monitoring system restores the failed optical path via an optical cross-connect mesh, thereby reducing the failure to a single failure. The subnetwork can then restore itself and minimize traffic downtime.

BRIEF DESCRIPTION OF THE DRAWINGS

FIG. 5 depicts a multi-ring SONET optical network that includes an optical cross-connect facility in accordance with the invention for providing restoration in case of a double ring failure; and FIG. 6 depicts the manner in which the network of FIG. 5 effects restoration in case of a double ring failure.

DETAILED DESCRIPTION

Figure 1:
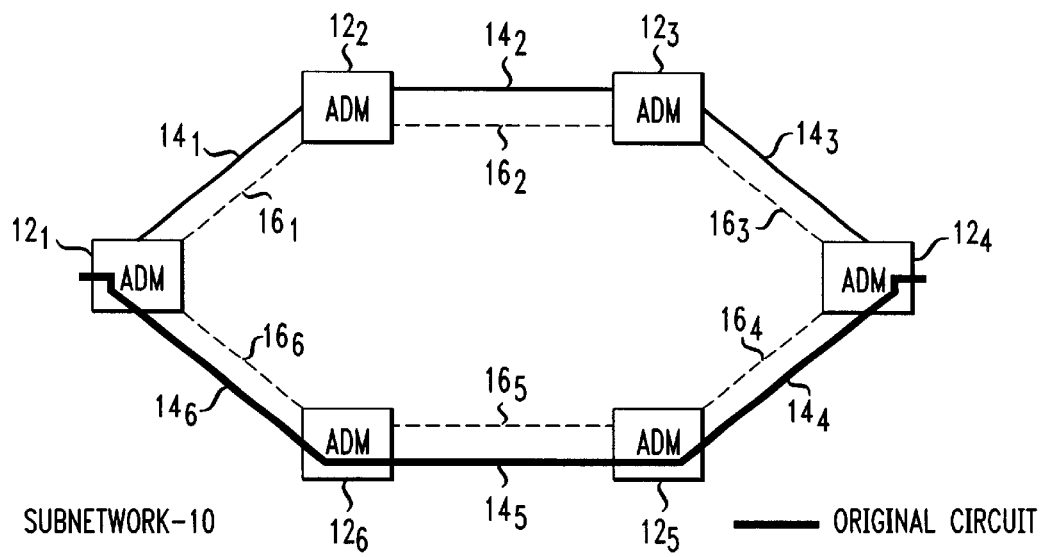
FIG. 1 depicts a conventional SONET optical transport network under normal (non-failure) operating conditions.

FIG. 1 depicts a prior-art optical transport subnetwork 10 in the form of a SONET ring comprised of a plurality of nodes $12_1$, $12_2$ $12_3$... $12_n$ where n is an integer. In the illustrated embodiment n=six although the subnetwork 10 could comprise a larger or smaller number of nodes. In practice, each node $12_i$ (where i is an integer $\leq$ n) comprises an Add-Drop Multiplexer (ADM) as are known in the art for placing optically formatted traffic onto, and withdrawing optically formatted traffic of off, the subnetwork 10. Each node $12_i$ is connected to each of its two closest neighboring nodes by a corresponding one of bidirectional optical service paths $14_1$–$14_n$, respectively in a daisy-chain fashion to form a ring. Additionally, each node $12_i$ is connected to each of its two closest neighboring nodes by a corresponding one of bidirectional optical protection paths $16_1$–$16_n$ respectively, in a daisy-chain fashion to form a ring. The two-individual rings formed by the optical service paths $14_1$–$14_n$ and the optical protection paths $16_1$–$16_n$ comprise the SONET ring subnetwork 10.

Figure 2:
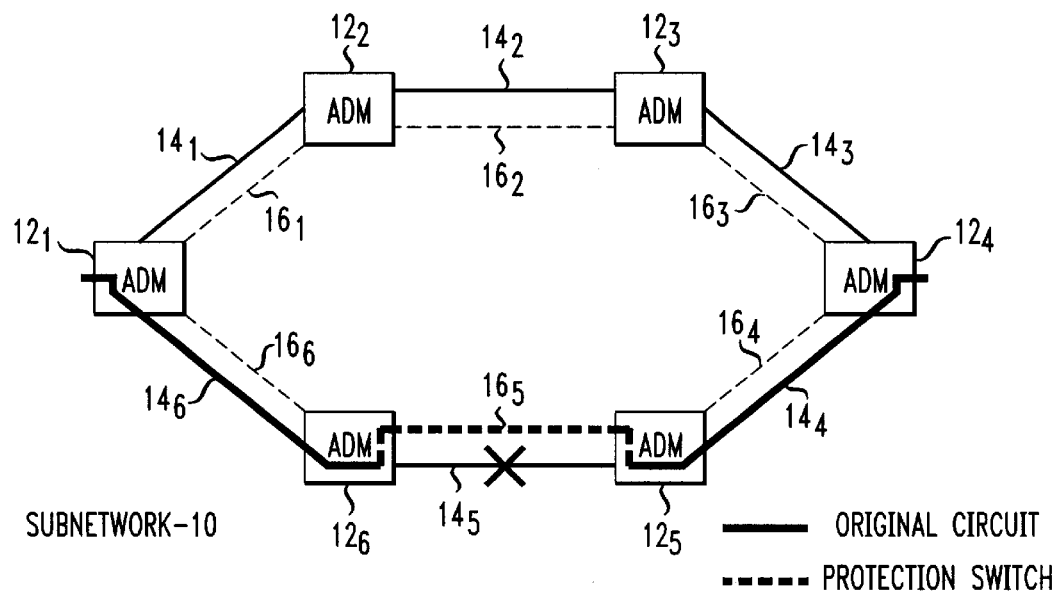
FIG. 2 depicts the SONET optical transport network of FIG. 1 in the case of a span failure.

During normal operation, optically formatted traffic passes from node to node in the subnetwork 10 along a corresponding one of the optical service paths $14_1$–$14_n$. The optical protection paths $16_1$–$16_n$ generally remain in reserve to carry traffic in case of an optical service path failure. Thus, for example, under normal conditions, traffic originating at node $12_1$ and destined for node $12_4$ passes between the nodes $12_6$ and $12_5$ via the optical service paths $14_6$, $14_5$, and $14_4$. Referring to FIG. 2, should an optical service path, such as path $14_5$, fail, due to a failure of traffic bearing equipment on the path, network restoration can be achieved by routing traffic between the nodes via the optical restoration path $16_5$.

Figure 3:
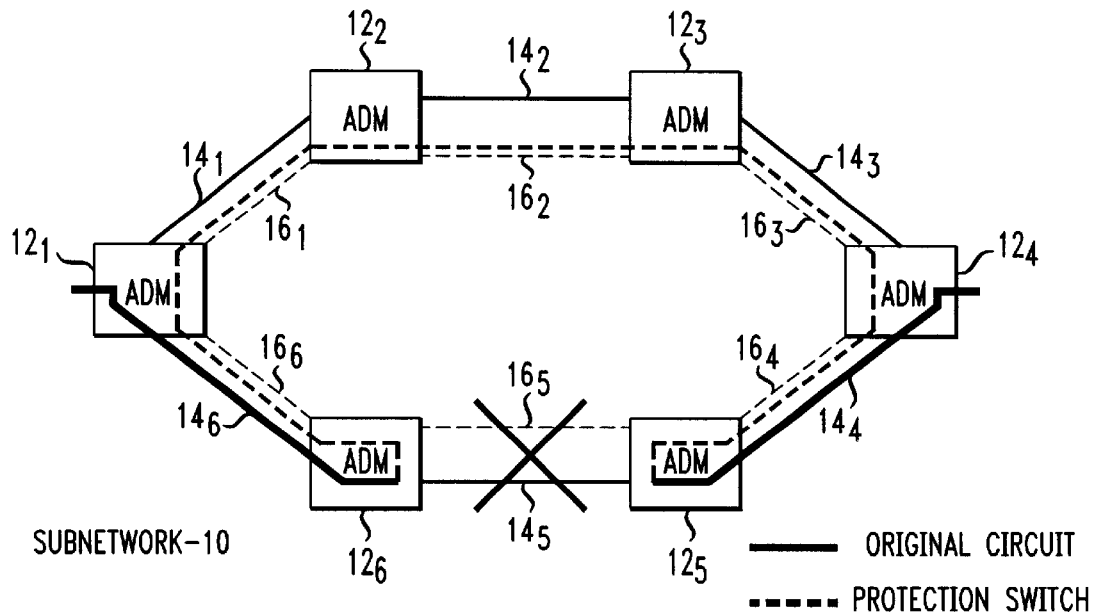
FIG. 3 depicts the SONET optical transport network of FIG. 1 in the case of a fiber facility failure.

FIG. 3 depicts a fiber facility failure in the subnetwork 10, exemplified by a fiber cut of both $14_5$ and $16_5$ between nodes $12_5$ and $12_6$. The failure of both of the paths $14_5$ and $16_5$ prevents traffic from passing between these nodes. Restoration for this failure occurs by routing the traffic received at the node $12_6$ back to the node $12_1$ along the optical protection path $16_6$. From node $12_1$, the traffic passes on the optical protection paths $16_1$, $16_2$, $16_3$, and $16_4$ to the node $12_5$. As with the restoration paths depicted in FIG. 2, the restoration paths depicted in FIG. 3 all lie within the subnetwork 10.

Figure 4:
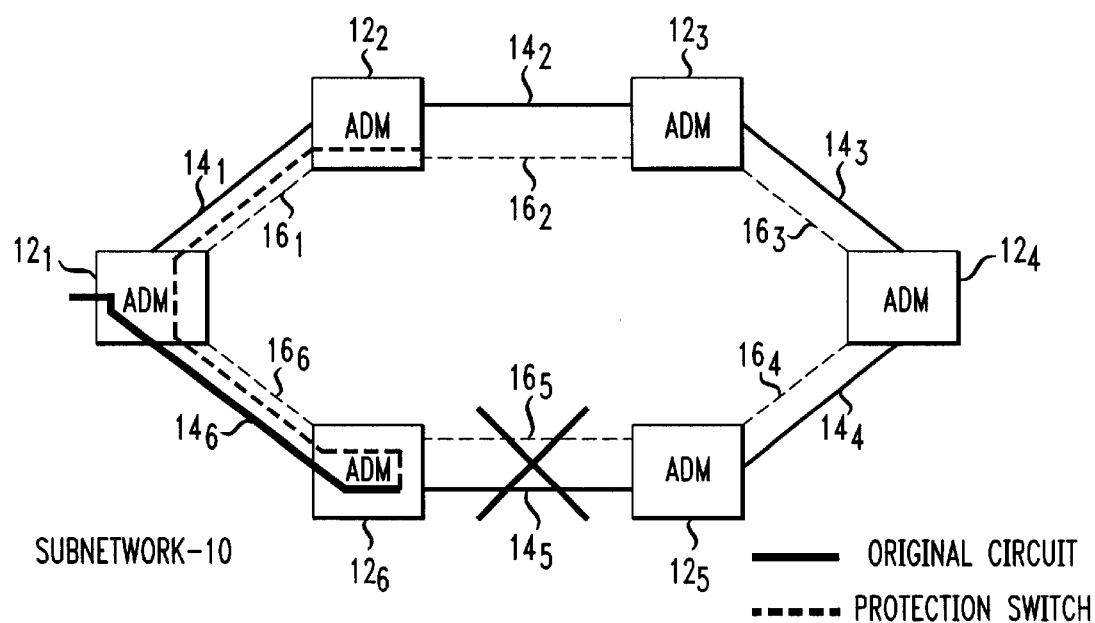
FIG. 4 depicts the SONET optical transport of FIG. 1 in the case of both a fiber facility failure and a node failure.

FIG. 4 depicts the situation where the protection path between nodes $12_2$ and $12_3$ is unavailable due to the failure of the optical service path between these nodes as described above with respect to FIG. 3, or the failure of traffic bearing equipment (e.g., an ADM) at one or both of these nodes, and the failure of the service and protection paths $14_5$ and $16_5$, from a cable break, for example. As described above with respect to FIG. 3, upon the failure of the service and protection optical paths between the nodes $12_5$ and $12_6$, restoration can occur by routing traffic on the optical protection paths $16_6$, $16_1$, $16_2$, $16_3$, and $16_4$ to the node $12_5$. However, should an optical protection path, say path $16_2$, become inoperative in addition to the failure of the service and protection paths $14_5$ and $16_5$, then restoration can not occur in the subnetwork 10. In other words, in case of a "double" failure (i.e. the failure of the protection path between a pair of nodes, and the failure of a non-associated optical path) as seen in FIG. 4, no restoration path exists within the subnetwork 10 itself.

FIG. 5 depicts an optical transport network 100 in accordance with the invention for accomplishing restoration within a subnetwork, such as the subnetwork 10 of FIG. 4 even in the event of a "double" failure. The network 100 of FIG. 5 includes at least one, and preferably, a plurality of ring subnetworks $10_1$, $10_2$... $10_m$ where m is an integer. In the illustrated embodiment, m=two although a larger number of ring networks is possible. Each ring subnetwork possesses a construction the same as the subnetwork 10 of FIGS. 1–4. In other words, each ring subnetwork $10_k$ of FIG. 5 (where k is an integer $\leq$ m) comprises a plurality of nodes $12_1$–$12_z$ (where z is an integer). Each node is linked to each of its two closest neighbors in daisy-chain fashion by optical service paths and optical protection paths (not shown). Each node $12_x$ (where x is an integer $\leq$ z) may include an ADM for placing optically formatted traffic onto, and for withdrawing traffic of off, the subnetwork 10.

In accordance with the invention, a multiple wavelength Optical Cross-Connect (OXC) mesh 22 connects to the ends of at least one optical service path of at least one of the rings $10_1$–$10_m$, via a plurality of individual paths within the OXC mesh to provide an alternate optical service path in place of the failed ring optical path to convert a double failure to a single failure restorable in the ring itself. The OXC mesh 22 comprises a plurality of Optical Cross-Connect Devices (OXCDs) $23_1$–$23_y$ (where y is an integer) arranged in a matrix-like fashion of rows and columns interconnected via optical links $24_1$–$24_8$. Exemplified in the illustrated embodiment of FIG. 5. the OXC mesh 22 comprises a hub and spoke arrangement of five OXCDs $23_1$–$23_5$. The OXCDs $23_1$–$23_4$ each lie at the corners of a hub depicted as being square, although the hub could assume other geometric shapes. The Optical links $24_1$–$24_4$ connect the OXCD pairs $23_1$–$23_2$, $23_1$–$23_3$, $23_3$–$23_4$, and $23_2$–$23_4$, respectively. The OXCD $23_5$ of the mesh 22 lies at the center of the hub, with each of the OXCDs $23_1$–$23_4$ connected thereto by the optical links $24_5$ . $24_8$, respectively. Typically, the optical service path is "opaque" in the manner discussed in the aforementioned Afferton et al. patent in that transmission of optically formatted traffic in the OXC mesh 22 is not adversely affected by the length of the links $24_1$–$24_y$.

As may be appreciated, the OXC mesh 22 provides a plurality of paths between OXCDs. For example, traffic received at the OXCD $23_1$ can pass to the OXCD $23_2$ via the optical link $24_1$. Rather than passing via the link $24_1$, the traffic could pass via the link $24_5$ to the OXCD $23_5$ and pass therefrom via the optical link $24_6$ to the OXCD $23_2$. Alternatively, the traffic could pass from the OXCD $23_1$ via the optical link $24_2$ to the OXCD $23_3$ and then to the OXCD $23_4$ via the link $24_3$ before passing to the OXCD $23_2$ via the link $24_4$. Other possible paths exist through the OXC mesh 22.

In the illustrated embodiment, some optical paths within the OXC mesh 22 provide service path connectivity between nodes within ring subnetworks (such as $12_1$ and $12_4$ in ring subnetwork $10_1$ or $12_1$ and $12_2$ in ring subnetwork $10_2$). The OXCDs of the OXCD mesh 22 are only connected to the ends of the ring subnetworks optical service paths but not the optical protection paths to avoid a potential race condition between the service paths and protection paths. Other optical paths within the OXC mesh 22 provide connectivity between ADMs that do not form ring subnetwork, but are instead connected linearly in a "point-to-point" fashion (such as nodes $25_1$ and $25_2$). Protection paths between "point-to-point" nodes connected to the OXC mesh, along with dedicated "restoration" paths, form the capacity used to build alternate optical paths for restoration ring failures. Tributary traffic is connected between ring and "point-to-point" subnetworks at hub offices (19) via digital cross-connect systems ($18_1$). In practice, multiple spans on the optical rings will include OXCDs, to provide dual failure coverage for a larger number of spans on each ring.

The network 100 of FIG. 5 includes an alarm and restoration system 28 of a type similar to that disclosed in the Askew et al. U.S. Pat. No. 5,182,744, herein incorporated by reference. The alarm and restoration system 28 includes a processor similar to the RAPID processor disclosed in the Askew et al. patent. The processor within the alarm and restoration system 28 monitors the traffic on the service and protection paths of the networks $10_1$–$10_m$ as well as the status of the traffic bearing equipment at the nodes $12_1$–$12_z$ within such networks to determine possible single and double failures. In the event of a single failure (i.e., the failure of a service path that is restorable via an optical protection path), the processor within the alarm and restoration system 28 signals allows the subnetwork itself to re-route traffic within the affected ring through an appropriate predetermined protection path within the subnetwork in the same manner as discussed with respect to FIGS. 2–4. In other words, the alarm and restoration system 28 allows the subnetwork itself to re-reroute traffic as necessary on one of the optical protection paths in the same ring.

However, in case of a double failure (i.e., a failure of an service path and the occupation of an unrelated optical protection path because of the failure of traffic bearing equipment at an associated node), the processor within the alarm and restoration system 28 routes traffic through the OXC mesh 22 to transform the double failure to a single failure in the ring itself. In practice, the alarm and restoration system 28 attempts restoration of a single failure in the affected ring first, rather than providing restoration via the OXC mesh 22. In this way, the alarm and restoration system 28 avoids a potential race condition.

Once traffic restoration occurs via the OXC mesh 22, then the affected portion of the ring subnetwork suffering the failure is taken out of service and repairs are made. Upon completion of repairs, the traffic is taken off the OXC mesh 22.

FIG. 6 depicts a portion of the transport network 100, including ring $10_I$ and a portion of the OXC mesh 22. As depicted in FIG. 6, the service optical path between nodes $12_I$ and $12_4$ are connected to OXCDs in the optical mesh. In practice, service optical paths between most or all of the nodes on the ring could be connected to OXCDs. Also in practice, a portion of each of the optical links $28_I$–$28_4$ (which includes a service and protection paths) may run between the same Optical Transport System Stations (OTSs) that terminate corresponding ones of the optical links $24_I$–$24_4$, respectively.

The OXC mesh 22 of FIG. 6 provides at least partial restoration for a double failure of the ADM ring by transforming a double failure into a single failure. To appreciate how the OXC mesh 22 of FIG. 6 provides for such restoration in the event of a double failure, assume that the optical service path $28_4$, part of optical link $24_2$, fails due to a cable cut. Further, assume an electronic failure of the ADM $12_3$ causes the protection optical service path $28_I$ to fail Under such conditions, traffic cannot pass between the ADMs $12_I$ and $12_4$ on either the service paths or the ring protection paths However, in accordance with the invention, the OXC mesh, in response to a command from the alarm and restoration system 28, will restore the service path $28_4$ between the ring ADMs $12_I$ and $12_4$ notwithstanding the failures on subnetwork $10_I$, by creating a alternate optical path through the OXC mesh 22 over optical links $24_5$ and $24_7$ The double failure that had previously existed now becomes a single failure associated electronics failure on link $28_I$ that can be restored in the ring $10_I$ as discussed previously.

As with the system 28 of FIG. 5, the alarm and restoration system 28' of FIG. 6, which is of the same construction, achieves restoration via the OXC mesh 22 only in case of a double failure. However, in case of a single failure, the alarm and restoration system 28' restores traffic within the ring of ADMs itself.

The foregoing describes a technique for restoring traffic in a plurality of ring networks via an OXC mesh 22 in case of a double failure.

The above-described embodiments are merely illustrative of the principles of the invention. Various modifications and changes may be made thereto by those skilled in the art, which will embody the principles of the invention and fall within the spirit and scope thereof.

What is claimed is:

1. A method for restoring optically formatted traffic in case of a failure in a ring subnetwork comprised of a plurality of nodes, each connected to each of its two closest neighbors in daisy chain fashion by at least one optical service path and at least one optical protection path, comprising the steps of:

monitoring the traffic within the ring subnetwork to detect the occurrence of a single failure arising from a failed optical service path and the occurrence of a double failure arising from a failed optical service path and an occupied optical protection path;

determining whether a detected failure is a single type or a double type;

restoring traffic within the ring subnetwork in the event of a single failure by allowing the ring subnetwork to re-route traffic from a failed service path to a predetermined optical protection path within the ring subnetwork; but in the event of a double failure;

routing traffic into an Optical Cross-Connect (OXC) mesh comprising a plurality of interconnected Optical Cross-Connect Devices (OXCDs) to transform a double failure into a single failure by providing a path through the OXC mesh for traffic otherwise capable of passing upon restoration for a single failure; and restoring the single failure in the ring subnetwork.

2. The method according to claim 1 wherein the traffic is routed via the OXC mesh only so long as the ring subnetwork suffers a double failure and upon repair of the ring subnetwork, traffic is routed therein in the same manner prior to the failure.

3. The method according to claim 1 wherein restoration in the ring subnetwork for a single failure is attempted prior to restoration via the OXC mesh.

4. In combination with a ring subnetwork comprised of a plurality of nodes, each node in each network connected to each of its two closest neighboring nodes in daisy chain fashion by at least one optical service path and at least one optical protection path, a system for accomplishing restoration, comprising:

an Optical Cross-Connect mesh formed of a matrix of Optical Cross-Connect Devices (OXCDs) connected to each other such that the mesh provides a plurality of paths between each OXCD, and an alarm and restoration system for: (1) monitoring the traffic within the ring subnetwork to detect the occurrence of a single failure arising from a failed optical service path and the occurrence of a double failure arising from a failed optical service path and an occupied optical protection path; (2) determining, whether a detected failure is a single type or a double type; (3) restoring traffic within the ring subnetwork in the event of a single failure by allowing the ring subnetwork to re-route traffic on a predetermined one of the optical protection paths within the subnetwork itself from a failed one of a optical service paths, but in the event of a double failure; routing traffic into the Optical Cross-Connect (OXC) mesh for passage to transform the failure from a double type to a single type for restoration in the ring subnetwork.

5. The system according to claim 4 wherein the ring subnetwork includes a plurality of Add-Drop Multiplexers linked to each other in a ring like arrangement by optical service paths each linked to node of a separate ring and each linked to one of the OXCDs of the optical mesh.

6. The system according to claim 5 wherein the optical links linking the OXCDs and the optical links linking the Add-Drop multiplexers are supported by a common optical transport systems.

* * * * *